US011700197B2

(12) United States Patent
Montero (10) Patent No.: US 11,700,197 B2
(45) Date of Patent: *Jul. 11, 2023

(54) INCOMING COMMUNICATION ROUTING

(71) Applicant: Sorenson IP Holdings, LLC, Salt Lake City, UT (US)

(72) Inventor: Adam Montero, Midvale, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/409,422

(22) Filed: Aug. 23, 2021

(65) Prior Publication Data

US 2021/0385156 A1   Dec. 9, 2021

Related U.S. Application Data

(63) Continuation of application No. 16/016,177, filed on Jun. 22, 2018, now Pat. No. 11,128,563.

(51) Int. Cl.
*H04L 45/655* (2022.01)
*H04L 45/302* (2022.01)
*H04L 67/53* (2022.01)

(52) U.S. Cl.
CPC ............ *H04L 45/306* (2013.01); *H04L 67/53* (2022.05)

(58) Field of Classification Search
CPC ............... H04L 45/306; H04L 67/53; H04L 2012/562; H04L 2012/6443; H04L 45/021; H04L 45/72; H04L 49/309; H04L 49/3009; H04M 7/0075; H04M 7/128;

(Continued)

(56) References Cited

U.S. PATENT DOCUMENTS

| 5,537,470 A | 7/1996 | Lee |
| 5,825,772 A | 10/1998 | Dobbins et al. |
| 5,875,240 A | 2/1999 | Silverman |

(Continued)

FOREIGN PATENT DOCUMENTS

| KR | 101023552 B1 | 3/2011 |
| KR | 20160138832 A | 12/2016 |

(Continued)

OTHER PUBLICATIONS

Intelligent Reconnect, Talkdesk, thttps://www.talkdesk.com/call-center-software-features/intelligent-reconnect/, retrieved on Mar. 19, 2018.

(Continued)

*Primary Examiner* — Thu Ha T Nguyen
(74) *Attorney, Agent, or Firm* — Maschoff Brennan (57) ABSTRACT

The present application includes operations related to routing communications. In some embodiments, the operations may include receiving, from a third-party communication address, an incoming communication directed toward a general communication address associated with a communication system. The operations may also include routing the incoming communication to a specific communication address associated with the communication system instead of to the general communication address based on a previous outgoing communication being from the specific communication address and being directed toward the third-party communication address.

20 Claims, 3 Drawing Sheets

(58) Field of Classification Search
CPC ... H04M 2203/2011; H04M 2203/408; H04M 15/8271; H04M 2215/7873
USPC .......................................... 709/237, 238, 239
See application file for complete search history.

(56) References Cited

U.S. PATENT DOCUMENTS

| | | | |
|---|---|---|---|
| 6,098,108 A | 8/2000 | Sridhar et al. | |
| 6,243,754 B1 | 6/2001 | Guerin et al. | |
| 6,363,411 B1* | 3/2002 | Dugan | H04M 15/90 709/202 |
| 6,697,783 B1 | 2/2004 | Brinkman | |
| 6,704,303 B1* | 3/2004 | Bowman-Amuah | H04M 15/49 370/352 |
| 6,707,812 B1* | 3/2004 | Bowman-Amuah | H04L 41/0604 370/353 |
| 6,711,171 B1 | 3/2004 | Dobbins et al. | |
| 6,731,625 B1* | 5/2004 | Eastep | H04L 69/16 379/93.07 |
| 6,779,030 B1* | 8/2004 | Dugan | H04Q 3/0037 379/221.08 |
| 6,829,349 B1* | 12/2004 | Neale | H04M 3/436 379/265.09 |
| 7,023,979 B1* | 4/2006 | Wu | H04M 3/5233 379/265.11 |
| 7,028,225 B2 | 4/2006 | Maso et al. | |
| 7,085,814 B1 | 8/2006 | Gandhi et al. | |
| 7,660,580 B2 | 2/2010 | Jiang | |
| 7,944,822 B1 | 5/2011 | Nucci et al. | |
| 8,144,853 B1* | 3/2012 | Aboujaoude | H04M 3/42374 455/418 |
| 8,160,056 B2* | 4/2012 | Van der Merwe | H04L 45/42 709/239 |
| 8,180,916 B1 | 5/2012 | Nucci et al. | |
| 8,223,953 B2 | 7/2012 | Houmaidi et al. | |
| 8,280,989 B2 | 10/2012 | Archer et al. | |
| 8,510,443 B2 | 8/2013 | Kim | |
| 8,555,297 B1 | 10/2013 | Gould et al. | |
| 8,780,796 B1 | 7/2014 | Ballal et al. | |
| 9,036,504 B1 | 5/2015 | Miller et al. | |
| 9,407,539 B1 | 8/2016 | Dickinson et al. | |
| 9,473,621 B1* | 10/2016 | Apple | H04L 63/0861 |
| 9,537,734 B2 | 1/2017 | Paek et al. | |
| 10,171,889 B2* | 1/2019 | Clark | H04M 3/46 |
| 10,298,770 B1* | 5/2019 | Liu | H04M 7/009 |
| 10,388,272 B1 | 8/2019 | Thomson et al. | |
| 10,419,287 B2 | 9/2019 | Miller et al. | |
| 10,462,291 B1* | 10/2019 | Ravichandran | H04M 3/465 |
| 10,650,684 B2 | 5/2020 | Ricci | |
| 10,904,012 B1 | 1/2021 | Duncan et al. | |
| 11,128,563 B2* | 9/2021 | Montero | H04L 45/22 |
| 11,425,260 B1* | 8/2022 | Liu | H04L 65/1056 |
| 2003/0112938 A1 | 6/2003 | Kanakubo et al. | |
| 2003/0123632 A1* | 7/2003 | Smith | H04Q 3/66 379/220.01 |
| 2005/0074114 A1* | 4/2005 | Fotta | H04M 3/5158 379/266.08 |
| 2005/0089016 A1 | 4/2005 | Zhang et al. | |
| 2005/0111644 A1* | 5/2005 | Edwards | H04M 15/06 379/142.01 |
| 2005/0201540 A1 | 9/2005 | Rampey et al. | |
| 2005/0213740 A1* | 9/2005 | Williams | H04M 7/0033 379/207.02 |
| 2005/0215233 A1* | 9/2005 | Perera | H04W 12/06 455/410 |
| 2005/0249196 A1* | 11/2005 | Ansari | H04L 65/1069 370/352 |
| 2006/0064583 A1 | 3/2006 | Birnbaum et al. | |
| 2006/0098642 A1 | 5/2006 | Mallya et al. | |
| 2006/0137015 A1 | 6/2006 | Fahrny et al. | |
| 2006/0251054 A1* | 11/2006 | Peters | H04M 7/128 370/352 |
| 2007/0032225 A1 | 2/2007 | Konicek et al. | |
| 2007/0047491 A1 | 3/2007 | Dutta et al. | |
| 2007/0064912 A1* | 3/2007 | Kagan | H04M 3/5232 379/265.1 |
| 2007/0153990 A1* | 7/2007 | Daigle | H04M 3/42042 379/88.19 |
| 2007/0153991 A1* | 7/2007 | Daigle | H04M 3/42042 379/88.21 |
| 2007/0154005 A1 | 7/2007 | Daigle | |
| 2007/0155370 A1* | 7/2007 | Daigle | H04M 3/42263 455/415 |
| 2007/0248077 A1 | 10/2007 | Mahle, Jr. et al. | |
| 2007/0254636 A1 | 11/2007 | Jiang | |
| 2007/0288566 A1* | 12/2007 | Murakami | G06Q 10/107 709/204 |
| 2008/0162637 A1 | 7/2008 | Adamczyk et al. | |
| 2008/0175374 A1 | 7/2008 | Lauridsen et al. | |
| 2008/0280644 A1 | 11/2008 | Hugot | |
| 2009/0025075 A1* | 1/2009 | Chow | H04W 7/123 726/10 |
| 2009/0046839 A1* | 2/2009 | Chow | H04M 3/382 379/142.01 |
| 2009/0086953 A1 | 4/2009 | Vendrow | |
| 2009/0106394 A1* | 4/2009 | Lin | H04L 61/2564 709/218 |
| 2009/0201916 A1 | 8/2009 | Caron et al. | |
| 2009/0323636 A1* | 12/2009 | Dillon | H04L 65/103 455/433 |
| 2010/0048191 A1 | 2/2010 | Bender et al. | |
| 2010/0111287 A1 | 5/2010 | Xie et al. | |
| 2010/0158225 A1* | 6/2010 | Rogers | H04M 15/00 379/207.14 |
| 2010/0220585 A1* | 9/2010 | Poulson | H04L 45/22 370/216 |
| 2010/0279718 A1 | 11/2010 | Borve | |
| 2010/0322399 A1 | 12/2010 | Couse et al. | |
| 2011/0105154 A1 | 5/2011 | Kim | |
| 2011/0276717 A1* | 11/2011 | Bellamy, III | G06Q 20/02 709/238 |
| 2012/0084461 A1 | 4/2012 | Athias et al. | |
| 2012/0099719 A1 | 4/2012 | Erb | |
| 2012/0191716 A1 | 7/2012 | Omoigui | |
| 2012/0198084 A1 | 8/2012 | Keskitalo et al. | |
| 2012/0203856 A1 | 8/2012 | Wu et al. | |
| 2012/0213060 A1* | 8/2012 | Poulson | H04L 45/28 370/225 |
| 2012/0224681 A1 | 9/2012 | Desai et al. | |
| 2012/0231767 A1 | 9/2012 | Kagawa | |
| 2012/0239822 A1* | 9/2012 | Poulson | H04L 41/0654 709/239 |
| 2012/0290311 A1 | 11/2012 | Tara et al. | |
| 2012/0290638 A1 | 11/2012 | Narula et al. | |
| 2012/0315881 A1 | 12/2012 | Woloshyn | |
| 2013/0036476 A1 | 2/2013 | Roever et al. | |
| 2013/0078943 A1 | 3/2013 | Biage et al. | |
| 2013/0094643 A1 | 4/2013 | Osterlund | |
| 2014/0162615 A1 | 6/2014 | Shaw | |
| 2014/0189847 A1 | 7/2014 | Shen et al. | |
| 2014/0192708 A1 | 7/2014 | Wise | |
| 2014/0254434 A1 | 9/2014 | Jain et al. | |
| 2014/0282041 A1 | 9/2014 | Walker et al. | |
| 2015/0036549 A1 | 2/2015 | Martinez Perea et al. | |
| 2015/0040238 A1* | 2/2015 | Sarsa Sarsa | H04L 61/2539 726/26 |
| 2015/0085997 A1 | 3/2015 | Biage et al. | |
| 2015/0094046 A1* | 4/2015 | Jung | H04W 36/0022 455/415 |
| 2015/0094047 A1* | 4/2015 | Jung | H04W 12/08 455/415 |
| 2015/0095477 A1* | 4/2015 | Jung | H04M 1/57 709/223 |
| 2015/0200974 A1 | 7/2015 | Pearce et al. | |
| 2015/0200983 A1 | 7/2015 | Pearce et al. | |
| 2015/0264580 A1* | 9/2015 | Iwai | H04W 16/14 370/329 |
| 2015/0271338 A1 | 9/2015 | Turakhia | |

(56) References Cited

U.S. PATENT DOCUMENTS

| | | | |
|---|---|---|---|
| 2015/0289138 A1* | 10/2015 | Wang | H04W 12/08 |
| | | | 455/411 |
| 2015/0370970 A1 | 12/2015 | Zebarjadi et al. | |
| 2016/0012465 A1 | 1/2016 | Sharp | |
| 2016/0028749 A1 | 1/2016 | Murynets et al. | |
| 2016/0070924 A1 | 3/2016 | Saliba et al. | |
| 2016/0142536 A1 | 5/2016 | Bendi et al. | |
| 2016/0191698 A1* | 6/2016 | Dianda | H04M 3/42365 |
| | | | 370/352 |
| 2016/0219024 A1 | 7/2016 | Verzun et al. | |
| 2016/0351190 A1 | 12/2016 | Piernot et al. | |
| 2016/0373581 A1* | 12/2016 | DiPietro | G06F 16/958 |
| 2017/0034160 A1 | 2/2017 | Brands et al. | |
| 2017/0104876 A1 | 4/2017 | Hibbard et al. | |
| 2017/0154110 A1 | 6/2017 | Chen et al. | |
| 2017/0289168 A1 | 10/2017 | Bar et al. | |
| 2017/0329922 A1 | 11/2017 | Eberting et al. | |
| 2018/0032997 A1 | 2/2018 | Gordon et al. | |
| 2018/0103151 A1 | 4/2018 | Erm | |
| 2018/0190273 A1* | 7/2018 | Karimli | G10L 15/02 |
| 2018/0337782 A1 | 11/2018 | Wu et al. | |
| 2018/0359811 A1 | 12/2018 | Verzun et al. | |
| 2019/0182734 A1* | 6/2019 | Laliberte | H04L 65/1045 |
| 2019/0266550 A1* | 8/2019 | Santosh | G06F 9/54 |
| 2019/0340103 A1* | 11/2019 | Nelson | G06F 11/3636 |
| 2019/0373025 A1 | 12/2019 | Clark et al. | |
| 2020/0077892 A1 | 3/2020 | Tran | |
| 2020/0265048 A1 | 8/2020 | Dotan-Cohen et al. | |
| 2021/0149788 A1* | 5/2021 | Downie | G06F 11/3604 |
| 2021/0201250 A1* | 7/2021 | Santosh | G06Q 10/08 |
| 2022/0086274 A1* | 3/2022 | Knuth | H04M 1/576 |
| 2022/0094790 A1* | 3/2022 | Knuth | H04M 3/5141 |
| 2022/0150166 A1* | 5/2022 | Yang | H04L 12/4645 |

FOREIGN PATENT DOCUMENTS

| | | |
|---|---|---|
| WO | 1998039904 A1 | 9/1998 |
| WO | 2000005868 A1 | 2/2000 |

OTHER PUBLICATIONS

Goodbye *67, Hello Doximity Dialer, Doximity Blog, Dec. 13, 2016.

Search Report and Written Opinion received in International Application No. PCT/US2019/033970, dated Jul. 29, 2019.

* cited by examiner

INCOMING COMMUNICATION ROUTING

CROSS-REFERENCE TO RELATED APPLICATION

This application is a continuation of U.S. patent application Ser. No. 16/016,177, filed on Jun. 22, 2018, the disclosure of which is incorporated herein by reference in its entirety.

FIELD

The embodiments discussed herein are related to incoming communication routing.

BACKGROUND

An entity, such as a business, may have multiple communication addresses (e.g., telephone numbers, email addresses, etc.) that may be used to conduct communications. The communication addresses may include one or more general communication addresses that may be associated with the entity in general and one or more specific communication addresses that may be associated with particular individuals or groups who may be associated with the entity.

SUMMARY

The present application includes operations related to routing communications. In some embodiments, the operations may include receiving, from a third-party communication address, an incoming communication directed toward a general communication address associated with a communication system. The operations may also include routing the incoming communication to a specific communication address associated with the communication system instead of to the general communication address based on a previous outgoing communication being from the specific communication address and being directed toward the third-party communication address.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to systems and methods that may be configured to route incoming communications that may be received at a communication system. For example, the communication system may be configured to manage communications that may be directed to or originate from communication addresses of an entity. The communication addresses may include one or more general communication addresses that may be associated with the entity in general but that may not be associated with any one individual, such as a general telephone number or a general email address of the entity. Additionally, the communication addresses may include one or more specific communication addresses that may be associated with particular individuals or groups of individuals who may be associated with the entity (e.g., employees, owners, members, etc.).

In these or other embodiments, the communication system may be configured to route an outgoing communication that originated from a specific communication address such that the outgoing communication is identified on the receiving end as coming from the general communication address. For example, a telephone call from a specific telephone number of the entity may be routed such that the telephone call may be identified by a device that receives the telephone call as being from a general telephone number of the entity instead of from the specific telephone number. As another example, an email sent from a specific email address of the entity may be routed such that the email may be identified in the receiving email account as being from a general email address of the entity.

In some instances, a person who receives the outgoing communication may attempt to reply to the outgoing communication. For example, the person may attempt to return a phone call associated with the outgoing communication or reply to an email associated with the outgoing communication. However, given that the outgoing communication may be indicated on the receiving end as being derived from a general communication address, the incoming reply communication may be originally directed toward the general communication address instead of to the specific communication address from which the previous outgoing communication originated.

According to one or more embodiments of the present disclosure, a communication system may be configured such that incoming communications that are directed toward a general communication address may be routed to a specific communication address based on previous outgoing communications. For example, the communication system may receive an incoming communication from a third-party communication address. The incoming communication may be directed toward a general communication address associated with the communication system. The communication system may be configured to determine whether the third-party communication address was a destination address of a previous outgoing communication from a specific communication address associated with the communication system. In response to determining that the third-party communication address was the destination address of a particular previous outgoing communication, the communication system may identify a particular specific communication address associated with the communication system from which the particular previous outgoing communication originated. The communication system may route the incoming communication to the particular specific communication address based on the particular previous outgoing communication originating from the particular specific communication address and based on the particular previous outgoing communication being directed toward the third-party communication address.

The communication system configured in this manner may be an improvement on communication systems by intelligently routing incoming communications to specific communication addresses that may be better suited for receiving the incoming communications than a general communication address. Such improvements may include, for example, increased efficiency by bypassing traditional mechanisms used to direct incoming communications based on user input or manual forwarding of communications by individuals. Additionally, the intelligent routing may reduce availability to outsiders of specific communication addresses while also allowing outsiders to directly contact specific communication addresses.

Figure 1:
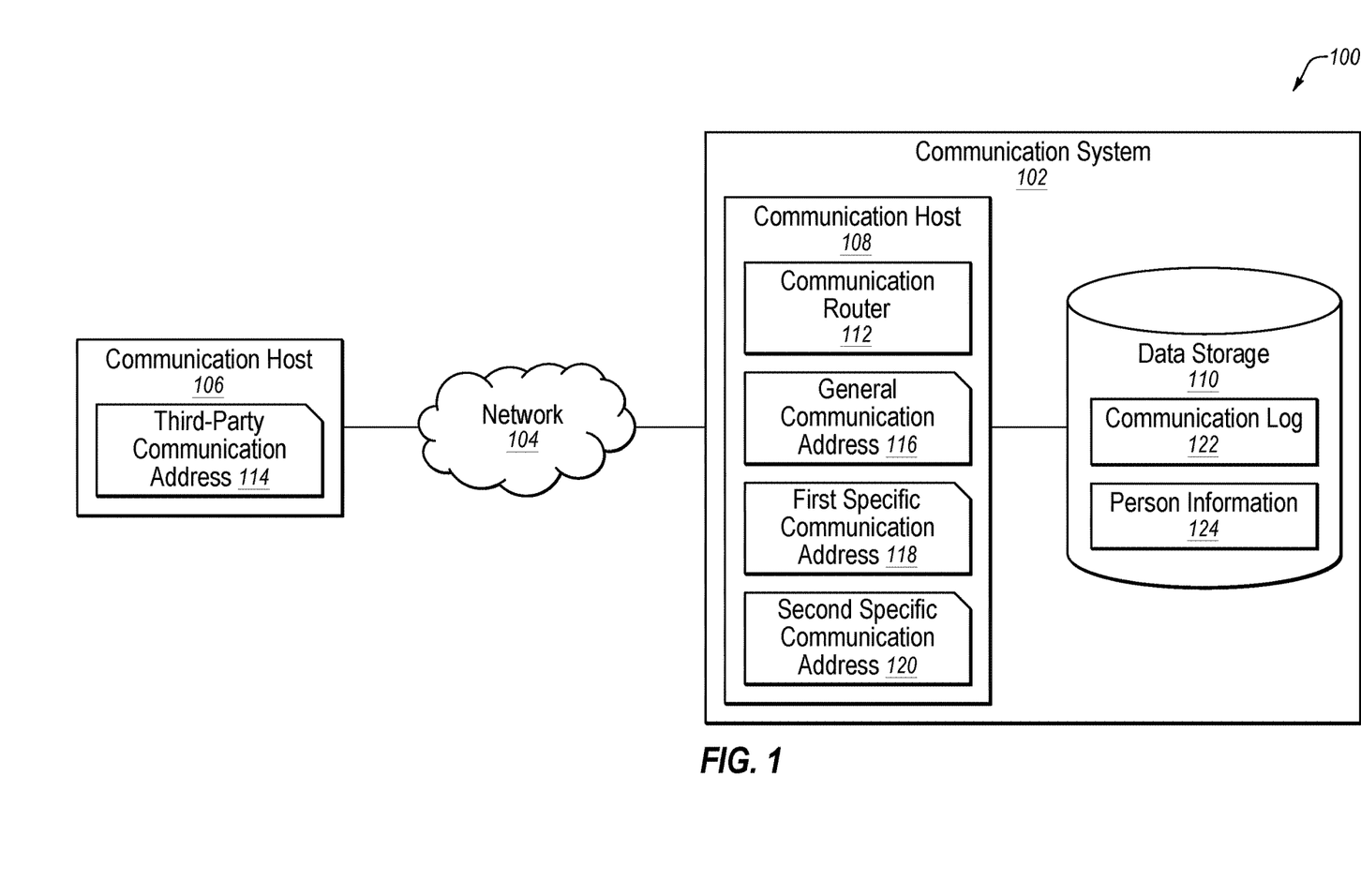
FIG. 1 illustrates an example environment related to routing incoming communications received at a communication system.

Turning to the figures, FIG. 1 illustrates an example environment 100 related to routing incoming communications received at a communication system 102. The environment 100 may be arranged in accordance with at least one embodiment described in the present disclosure. The environment 100 may include the communication system 102, a network 104, and a communication host 106. The communication system 102 may include a communication host 108 and data storage 110.

The network 104 may be configured to communicatively couple the communication host 106 and the communication system 102. In some embodiments, the network 104 may be any network or configuration of networks configured to send and receive communications between systems and devices. In some embodiments, the network 104 may include a wired network, an optical network, and/or a wireless network, and may have numerous different configurations. In some embodiments, the network 104 may include a peer-to-peer network. The network 104 may also be coupled to or may include portions of a telecommunications network for sending data in a variety of different communication protocols. In some embodiments, the network 104 may include an Internet Protocol (IP) based network such as the Internet. In some embodiments, the network 104 may include cellular communication networks for sending and receiving communications and/or data including via hypertext transfer protocol (HTTP), direct data connection, wireless application protocol (WAP), etc. The network 104 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. In these or other embodiments, the network 104 may include any combination of analog, digital, and/or optical networks that form a public switched telephone network (PSTN) that may transport audio of a communication session.

The communication host 106 may be configured to conduct communications related to a third-party communication address 114 ("third-party address 114"). The third-party address 114 may be any suitable identifier of a third-party communication account ("third-party account"). Additionally or alternatively, the third-party address 114 may be used by devices or systems to establish communications with or provide communications to the third-party account and/or to identify that communications originated from the third-party account. Reference to a "third-party communication address" or a "third-party communication account" in the present disclosure may include communication addresses or communication accounts that may be managed or associated with a communication system that is separate from the communication system 102.

The third-party account may include any account that may be used to conduct communications. For example, the third-party account may include a landline telephone account, a mobile telephone account, an email account, a social media account, a video call account (e.g., a SKYPE® account), etc. Examples of the third-party address 114 may include a landline telephone number, a mobile telephone number, an email address, a username, etc.

In some embodiments, the communication host 106 may include memory and at least one processor, which are configured to perform operations as described in this disclosure, among other operations. Additionally or alternatively, the communication host 106 may include computer-readable instructions that are configured to be executed by the communication host 106 to perform operations described in this disclosure.

As indicated above, the communication host 106 may include any suitable apparatus, system, or device that may be configured to conduct communications related to the third-party address 114. Conducting communications related to the third-party address 114 may include the communication host 106 accessing, by sending data to or retrieving data from, the third-party account associated with the third-party address 114 where the third-party account is hosted by another system. Alternatively or additionally, conducting communications related to the third-party address 114 may include the communication host 106 managing the third-party account, receiving communications directed toward the third-party address 114, sending communications originating from the third-party address 114, relaying communications directed toward or from the third-party address 114, storing communications associated with the third-party address 114, etc.

Examples of the communication host 106 may include devices that may be associated with a person to whom the third-party account may belong or may be assigned. For instance, in some embodiments, the communication host 106 may include a desktop computer, a laptop computer, a smartphone, a mobile phone, a tablet computer, a telephone, a phone console, etc. that may be used by the person with respect to conducting communications related to the third-party address 114.

Additionally or alternatively, the communication host 106 may be associated with a communication service provider that manages the third-party address 114 and/or the third-party account and the corresponding services associated with the third-party account. In these or other embodiments, the communication host 106 may include one or more systems, apparatuses, or devices that that are configured to manage the third-party account and corresponding operations of the third-party account. For instance, the communication host 106 may include one or more servers of a communication service provider of the third-party account that provide processing and storage infrastructure used to manage the third-party account. In these or other embodiments, the communication host 106 may include one or more access points (e.g., base stations, switching stations, routers, etc.) of the communication service provider that route communications associated with the third-party account and the third-party address 114.

The communication system 102 may include any suitable configuration of hardware, such as processors, servers, and/or data storage servers that are communicatively coupled and configured to perform one or more tasks related to managing communications with respect to communication addresses and/or communication accounts of an entity. For example, the communication system 102 may include one or multiple computing systems, such as multiple servers that each include memory and at least one processor. As indicated above, the communication system 102 may include the communication host 108 and the data storage 110. In some embodiments, the communication host 108 and the data storage 110 may be part of or included in one or more of the same computing systems. Additionally or alternatively, the communication host 108 and the data storage 110 may be separate systems that do not share any computing systems.

In the present disclosure, communication addresses and/or communication accounts that are described as being managed by the communication system 102 may be referred to as being "associated with" the communication system 102. Alternatively, communication addresses and/or communication accounts that are not managed by the communication system 102 may not be "associated with" the communication system 102.

The communication host 108 may include any suitable system, apparatus, or device configured to manage one or more communication addresses associated with the communication system 102. In the present example, the communication host 108 may be configured to manage a general communication address 116 ("general address 116"), a first specific communication address 118 ("first address 118"), and a second specific communication address 120 ("second address 120"), which may each be associated with the communication system 102. Additionally, each of the general address 116, the first address 118, and the second address 120 may be associated with the same entity. For example, the general address 116 may be a general communication address that is associated with the entity in general, the first address 118 may be associated with (e.g., assigned) a first person associated with the entity (e.g., an employee, owner, member, etc., of the entity), and the second address 120 may be associated with a second person associated with the entity.

In these or other embodiments, the general address 116 may correspond to a general communication account ("general account") that may be assigned to or owned by the entity, the first address 118 may correspond to a first specific communication account ("first account") that may be assigned to or owned by the first person, and the second address 120 may correspond to a second specific communication account ("second account") that may be assigned to or owned by the second person. Additionally or alternatively, the communication host 108 may be configured to manage one or more of the general account, the first account, and the second account.

Management of the general address 116, the first address 118, and the second address 120 by the communication host 108 may include the routing of communications to and/or from the general address 116, the first address 118, and the second address 120. In some embodiments, the communication host 108 may route the communications via a communication router 112 ("router 112"). The router 112 and its corresponding operations are described in further detail below.

Management of the general account, the first account, and/or the second account by the communication host 108 may include performing operations or providing infrastructure that allows communications to be conducted via the general account, the first account, or the second account. For example, the communication host 108 may include one or more servers that are configured to store data associated with the general account, the first account, and/or the second account and/or associated with maintaining the general account, the first account, and/or the second account. Additionally or alternatively, the communication host 108 may be configured to handle communication protocols associated with the general account, the first account, and/or the second account.

The data storage 110 may include computer-readable storage media for carrying or having computer-executable instructions or data structures stored thereon. Such computer-readable storage media may include any available media that may be accessed by a general-purpose or special-purpose computer. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

In some embodiments, the data storage 110 may include a communication log 122. The communication log 122 may include log entries related to previous outgoing communications that originated from communication addresses associated with the communication system 102. Each log entry may include an origination address that is a particular communication address from which the corresponding previous outgoing communication may originate. Additionally, each log entry may include a destination address that is a particular communication address to which the previous corresponding outgoing communication may be directed. In these or other embodiments, each log entry may include other information such as a duration of the corresponding previous outgoing communication, a time and date of the corresponding previous outgoing communication, a day of the week of the corresponding previous outgoing communication, a purpose of the corresponding previous outgoing communication, an identifier of a person associated with the destination address, an identifier of a person associated with the origination address, a number of previous outgoing communications directed toward the destination address from the originating address, a number of previous incoming communications directed toward the originating address from the destination address, a total number of previous communications between the destination address and the originating address, etc.

By way of example, a first previous outgoing communication may originate from the first address 118 and may be directed toward the third-party address 114. In some embodiments, the communication log 122 may include a first log entry for the first previous outgoing communication. The first log entry may include the first address 118 as the originating address and may include the third-party address 114 as the destination address. In these or other embodiments, the first log entry may include one or more of: a duration of the first previous outgoing communication, a time and date of the first previous outgoing communication, a day of the week of the first previous outgoing communication, a purpose of the first previous outgoing communication, a number of previous outgoing communications directed toward the third-party address 114 from the first address 118, a number of previous incoming communications directed toward the first address 118 from the third-party address 114, and a total number of previous communications between the third-party address 114 and the first address 118.

Additionally or alternatively, as indicated above, the first address 118 may be associated with the first person associated with the entity. Additionally or alternatively, the third-party address 114 may be associated with a third person. In these or other embodiments, the first log entry may include a first identifier of the first person and/or a third identifier of the third person.

As another example, a second previous outgoing communication may originate from the second address 120 and may also be directed toward the third-party address 114. In some embodiments, the communication log 122 may include a second log entry for the second previous outgoing communication. The second log entry may include the second address 118 as the originating address and may include the third-party address 114 as the destination address. In these or other embodiments, the second log entry may include one or more of: a duration of the second previous outgoing communication, a time and date of the second previous outgoing communication, a day of the week of the second previous outgoing communication, a purpose of the second previous outgoing communication, a number of previous outgoing communications directed toward the third-party address 114 from the second address 120, a number of previous incoming communications directed toward the second address 120 from the third-party address 114, and a total number of previous communications between the third-party address 114 and the second address 120.

Additionally or alternatively, as indicated above, the second address 120 may be associated with the second person associated with the entity and the third-party address 114 may be associated with the third person. In these or other embodiments, the second log entry may include a second identifier of the second person and/or the third identifier of the third person.

The communication log 122 may include any number of log entries other than the first and second log entries given as examples. For example, one or more of the other log entries may include the first address 118 as the originating address and the third-party address 114 as the destination address or the first address 118 as the originating address and another third-party address as the destination address. Additionally or alternatively, one or more of the other log entries may include the second address 120 as the originating address and the third-party address 114 as the destination address or the second address 120 as the originating address and another third-party address as the destination address. Additionally or alternatively, one or more of the other log entries may include another specific communication address as the originating address and the third-party address 114 as the destination address or the other communication address as the originating address and another third-party address as the destination address. Additionally or alternatively, one or more of the other log entries may include the general address 116 as the originating address and the third-party address 114 as the destination address or the general address 116 as the originating address and another third-party address as the destination address.

Additionally or alternatively, the communication log 122 may include log entries related to incoming communications that may be received at the communication system 102. The log entries related to incoming communications may have similar information as those related to outgoing communications.

In some embodiments, the data storage 110 may include person information 124. The person information 124 may include information about one or more persons associated with a communication address. In some embodiments, the person information 124 may include information about persons associated with communication addresses associated with the communication system 102. For example, the person information 124 may include first information about the first person associated with the first address 118 and/or second information about the second person associated with the second address 120. In these or other embodiments, the person information 124 may include information about persons associated with third-party communication addresses. For example, the person information 124 may include information about the third person associated with the third-party address 114.

In some embodiments, the person information 124 may be organized as profiles of the corresponding persons. In these or other embodiments, the identifiers that may be included in the log entries of the communication log 122 may be used to identify specific person information of persons who may correspond to the identifiers. For example, the first identifier of the first person included in the first log entry described above may be used to identify first person information of the first person.

In some embodiments, the person information 124 may be included in the communication log 122. For example, person information of persons associated with a particular communication may be included in a corresponding log entry. For instance, the first person information of the first person and/or third person information of the third person may be included in the first log entry described above.

The person information 124 may include any sort of information about the corresponding persons. In some embodiments, the person information 124 associated with third-party communication addresses may include information that may be used in the routing of incoming calls from the third-party communication addresses. For example, in some embodiments, the third person information about the third person associated with the third-party address 114 may include demographic information of the third person, including name, age, sex, address, etc., among other demographic data. In these or other embodiments, the third person information may further include health related information about the third person. For example, the health related information may include the height, weight, medical allergies, previous medical procedures, amount of time since previous medical procedures, and current medical conditions, physical limitations etc., among other health related information. As another example, the third person information may include a purchase history, feedback history (e.g., reviews, complaints, compliments), online activity, etc. of the third person.

Additionally or alternatively, the person information 124 associated with communication addresses that are associated with the communication system 102 may include information about persons associated with the communication system 102 that may be used in routing incoming calls to particular communication addresses associated with the communication system 102. For example, the first person information of the first person associated with the first address 118 may include credentials, an expertise level, a specialty, education, a department, a schedule (e.g., a work schedule), position, responsibilities, etc. of the first person.

The second person information may include similar information about the second person associated with the second address 120.

As indicated above, the router 112 may be configured to route communications directed toward or directed from the communication addresses associated with the communication system 102. The router 112 may include code and routines configured to enable a computing device to perform the operations of the router 112 as described in the present disclosure. Additionally or alternatively, the router 112 may be implemented using hardware including a processor, a microprocessor (e.g., to perform or control performance of one or more operations), a field-programmable gate array (FPGA), or an application-specific integrated circuit (ASIC). In some other instances, the router 112 may be implemented using a combination of hardware and software. In the present disclosure, operations described as being performed by the router 112 may include operations that the router 112 may direct a corresponding system (e.g., the communication host 108 and/or the communication system 102) to perform.

In some embodiments, the router 112 may be configured to route one or more outgoing communications that originate from a specific communication address through the general address 116. For example, with respect to the first previous outgoing communication discussed above, the router 112 may route the first previous outgoing communication that originated from the first address 118 through the general address 116 and then to the third-party address 114. As such, the first previous outgoing communication may be identified on the communication host 106 as coming from the general address 116 and not the first address 118. The router 112 may similarly route the second previous outgoing communication discussed above and that originated from the second address 120.

In these and other embodiments, routing an outgoing communication through the general address 116 may include obtaining the outgoing communication from a specific communication address and then sending the outgoing communication to the destination address from the general address 116. Alternatively or additionally, routing an outgoing communication through the general address 116 may include changing the origination address of the outgoing communication so that the general address 116 is used as the origination address in the outgoing communication in place of the specific communication address. In these and other embodiments, the changing of the origination address may be performed by the communication host 108, the communication router 112, or some other device in the communication system, such as a device particular to the specific communication address.

In these or other embodiments, the router 112 may be configured to generate log entries in the communication log 122 based on the routing of the outgoing communications. Additionally or alternatively, the router 112 may be configured to track information related to the outgoing communications and to enter the tracked information in the communication log 122. For example, with respect to the first previous outgoing communication, the router 112 may be configured to generate the first log entry and to include the first address 118 as the originating address and to include the third-party address 114 as the destination address in the first log entry. The router 112 may also be configured to include in the first log entry the purpose, the duration, the time of day, the date, and/or the day of the week of the first previous outgoing communication. In these or other embodiments, the router 112 may be configured to obtain the third identifier of the third person based on the third-party address 114 and may include the third identifier in the first log entry. Additionally or alternatively, the router 112 may be configured to obtain the first identifier of the first person based on the first address 118 and may include the first identifier in the first log entry. The router 112 may be configured to generate the second log entry based on the second outgoing communication in a similar manner.

In some embodiments, the router 112 may be configured to route one or more outgoing communications through the general address 116 to protect the specific communication addresses from being known or visible to persons who may be contacted. However, in some instances, the person being contacted may reply to a corresponding previous outgoing communication in which it may be advantageous for the person to communicate with the person associated with the previous outgoing communication. However, due to the general address 116 being used, the previously contacted person may not have the contact information (e.g., specific communication address) of the person who initiated the corresponding previous outgoing communication.

In some embodiments, the router 112 may accordingly be configured to route incoming communications that are directed toward the general address 116 to specific communication addresses associated with the communication system 102 based on previous outgoing communications placed from the communication system 102. As such, the specific communication addresses may still be unknown by the persons initiating the incoming communications while also putting the persons initiating the incoming communications in contact with persons with whom the persons initiating the incoming communications have previously interacted or who initially contacted the persons initiating the incoming communications.

To ease explanation, an example is given below with respect to the router 112 routing an incoming communication received from the third-party address 114. In some embodiments, the router 112 may be configured to route the incoming communication to a particular specific communication address associated with the communication system 102 based on a particular previous outgoing communication directed toward the third-party address 114 from the particular specific communication address. For example, the router 112 may route the incoming communication to the first address 118 based on the first previous outgoing communication discussed above being from the first address 118 and being directed toward the third-party address 114.

In some embodiments, the router 112 may route the incoming communication based on the communication log 122. For example, in some embodiments, in response to receiving the incoming communication, the router 112 may access the communication log 122 to determine whether the communication log 122 includes any log entries in which the third-party address 114 is listed as the destination address of any previous outgoing communications. For instance, the router 112 may search through the communication log 122 and may identify the first log entry discussed above based on the first log entry including the third-party address 114 as the destination address of the first previous outgoing communication.

In these or other embodiments, the router 112 may be configured to identify from the first log entry that the first address 118 is the originating address of the first previous outgoing communication. In some embodiments, the router 112 may be configured to route the incoming communication to the first address 118 based on the first address being the originating address of the first previous outgoing communication.

In these or other embodiments, the router 112 may also be configured to route the incoming communication based on one or more routing factors. As discussed below, the one or more routing factors may be determined based on the communication log 122 and/or the person information 124. By way of example, the one or more routing factors may include: an amount of time from when the previous outgoing communication was sent from the specific communication address to when the incoming communication was received; a current status of the specific communication address; a schedule of the person associated with the specific communication address; a communication type of the incoming communication; a time of day that the incoming communication is received; a day of the week that the incoming communication is received; a date that the incoming communication is received; a duration of one or more previous communications between the third-party communication address and the specific communication address; a number of previous communications between the third-party communication address and the specific communication address; information about a person associated with the specific communication address; information about a person associated with the third-party communication address; a purpose of the previous outgoing communication; and a purpose of the incoming communication.

Examples are given below with respect to how the routing factors may be used to determine the routing but the examples are not meant to be exhaustive. The examples are given with respect to the incoming communication received from the third-party address 114 and the first previous outgoing communication directed toward the third-party address 114 from the first address 118. However, the principles described in the examples may be applied to any number of other communications. Further, the examples given are not mutually exclusive in that the determination factors associated with one example may be combined with the determination factors associated with one or more other examples may be used to route a particular incoming communication.

In one example, the router 112 may be configured to route the incoming communication based on an amount of time from when the first previous outgoing communication was sent from the first address 118 to when the incoming communication was received. For example, in response to the amount of time being less than a threshold amount of time, the router 112 may be configured to route the incoming communication to the first address 118. In contrast, in response to the amount of time being greater than the threshold amount of time, the router 112 may be configured to route the incoming communication to the general address 116 or to another specific communication address such as the second address 120.

The threshold amount of time may be based on how likely it may be that routing the incoming communication to a particular specific communication address instead of to the general address 116 or another specific communication address may improve the efficiency of communications between the corresponding persons. For example, if the first previous outgoing communication was over 6 months prior to the incoming communication, the likelihood that the third person speaking to the first person as opposed to another person may be advantageous may be much lower than if the first previous outgoing communication occurred less than one day prior to the incoming communication. The threshold amount of time may be determined based on a historical analysis of communications, surveys, feedback, etc. Examples of the threshold amount of time may include 1 week, 1 month, 6 months, 1 year, etc.

In some embodiments, the router 112 may be configured to determine the amount of time from when the first previous outgoing communication was received to when the incoming communication was received based on the communication log 122. For example, the first log entry may include a time and date of the first previous outgoing communication. The router 112 may compare the time and date of the first previous outgoing communication against the time and date that the incoming communication was received to determine the amount of time between the first previous outgoing communication and the incoming communication.

In another example, the router 112 may be configured to route the incoming communication based on a current status of the first address 118. For example, the first address 118 may be associated with a telephone account and corresponding line. In this example, the current status of the first address 118 may be that the corresponding telephone line is currently in use such that the first address 118 is unavailable at that time. Based on the unavailability of the first address 118, the incoming communication may be routed to the general address 116 or a specific communication address other than the first address 118. Additionally or alternatively, the incoming communication may be routed to a voicemail box associated with the first address 118.

Additionally or alternatively, the current status may indicate that there is a queue with respect to communications with the first address 118 (e.g., a telephone queue). In these or other embodiments, the router 112 may route the incoming communication to the queue. Additionally or alternatively, the router 112 may route the incoming communication to the general address 116 or a specific communication address other than the first address 118 in response to the queue being longer than a threshold number and/or in response to an estimated wait time being longer than a threshold amount.

As another example, the first address 118 may be an email address and the current status of the first address 118 may be a number of unread emails in the corresponding email account. In these or other embodiments, the router 112 may route the incoming communication to the first address 118 in response to the number of unread emails being below a threshold number. Additionally or alternatively, the router 112 may route the incoming communication to the general address 116 or a specific communication address other than the first address 118 in response to the number of unread emails being greater than the threshold number.

In another example, the router 112 may be configured to route the incoming communication based on a time of day, a day of the week, and/or a date that the incoming communication was received and a schedule of the first person. For example, the schedule of the first person may indicate when the first person is available to attend to communications directed toward the first address 118. For instance, the schedule may indicate working times, meetings, vacations, etc. of the first person. In response to the schedule indicating that the first person is available at the time, day, or date that the incoming communication is received, the router 112 may route the incoming communication to the first address 118. In contrast, in response to the schedule indicating that the first person is not available at the time, day, or date that the incoming communication is received, the router 112 may route the incoming communication to the general address 116 or a specific communication address other than the first address 118.

Additionally or alternatively, the router 112 may be configured to route the incoming communication based on a communication type of the incoming communication and the schedule of the first person. For example, the incoming communication may be a telephone call and the schedule of the first person may indicate that the first person is unavailable at the time the incoming communication is received. As such, the router 112 may route the incoming communication to the general address 116 or a specific communication address other than the first address 118 as indicated above. In contrast, the incoming communication may be an email and the schedule of the first person may indicate that the first person is unavailable at the time the incoming communication is received. However, based on the incoming communication being an email, the router 112 may still route the incoming communication to the first address 118. In some embodiments, the router 112 may obtain the schedule of the first person from the first person information of the person information 124.

As another example, the router 112 may be configured to route the incoming communication based on a duration of one or more previous communications between the first address 118 and the third-party address 114. The previous communications may be outgoing to the third-party address 114 or incoming from the third-party address 114. For instance, in response to the first previous outgoing communication having a duration greater than a duration threshold amount of time (e.g., greater than 5 seconds), the router 112 may route the incoming communication to the first address 118. In contrast, in response to the first previous outgoing communication having a duration less than the duration threshold, the router 112 may route the incoming communication to the general address 116 or a specific communication address other than the first address 118. In these or other embodiments, the router 112 may route the incoming communication to the first address 118 when the first previous communication has a duration less than the duration threshold but also when one or more other previous communications between the first address 118 and the third-party address 114 having a duration greater than the duration threshold.

In some embodiments, the duration threshold may be based on a likelihood that the previous communication was mistakenly placed. For example, a relatively short communication may indicate that the communication was mistakenly placed. The duration threshold may be based on a historical analysis, surveys, etc. and may be anywhere between 1 and 10 seconds in some embodiments.

As another example, the router 112 may be configured to route the incoming communication based on a number of previous communications between the first address 118 and the third-party address 114. The previous communications may be outgoing to the third-party address 114 or incoming from the third-party address 114.

For instance, in response to number of previous communications being greater than a threshold number, the router 112 may route the incoming communication to the first address 118. In contrast, in response to the number of previous communications being less than the threshold number, the router 112 may route the incoming communication to the general address 116 or a specific communication address other than the first address 118. The threshold number of previous communications may be based on a historical analysis, surveys, etc. and may be anywhere between 2 and 10, in some embodiments.

As another example, the router 112 may be configured to route the incoming communication based on information about the third person and/or information about the first person. For example, in some embodiments, the router 112 may be configured to compare the information about the third person with the information about the first person to determine whether the first person may be suited to address the incoming communication. For instance, based on the information about the third person and the information about the first person, the router 112 may determine that the first person has a skill set or responsibility that may suit one or more factors that may be included in the information about the third person. The router 112 may accordingly route the incoming communication to the first address 118 based on such a determination.

In contrast, even though the first outgoing communication may have been initiated by the first person, the router 112 may be configured to determine, based on the comparison between the information about the third person and the information about the first person, that the first person may not be well suited to attend to the incoming communication. In some embodiments, the router 112 may accordingly be configured to route the incoming communication to the general address 116 or a specific communication address other than the first address 118 in some instances. In some embodiments, the router 112 may be configured to obtain the information about the first person and/or about the third person from the person information 124.

As another example, the router 112 may be configured to route the incoming communication based on a purpose of the first previous outgoing communication and information about the first person. For example, in some embodiments, the router 112 may be configured to compare the purpose of the first previous outgoing communication with the information about the first person to determine whether the first person may be suited to address the incoming communication. For instance, the router 112 may be configured to determine, based on the purpose of the first previous outgoing communication and the information about the first person, that the first person may be well suited to attend to the incoming communication. The router 112 may accordingly route the incoming communication to the first address 118.

In contrast, even though the first outgoing communication may have been initiated by the first person, the router 112 may be configured to determine, based on the purpose of the first previous outgoing communication and the information about the first person, that the first person may not be well suited to attend to the incoming communication. In some embodiments, the router 112 may accordingly be configured to route the incoming communication to the general address 116 or a specific communication address other than the first address 118 in some instances.

For example, the router 112 may route the incoming communication to a specific communication address associated with a person that may be well suited to attend to the incoming communication. For example, the first person may be a nurse that leaves a message with a third person regarding results of a medical test. The nurse may not be well suited to discuss how the results of the test reflect the health condition of the third person. The router 112 may route an incoming communication from the third person to a second person, which may be a doctor of the third person because the doctor may be better suited to attend to the incoming communication.

In some embodiments, the router 112 may be configured to obtain the information about the first person from the person information 124. In these or other embodiments, the router 112 may be configured to obtain the purpose of the first outgoing communication from the first log entry of the communication log 122.

As another example, the router 112 may be configured to route the incoming communication based on a purpose of the incoming communication and information about the first person in a manner similar to that described above with respect to routing the incoming communication based on the purpose of the first previous outgoing communication and information about the first person. In some embodiments, the router 112 may be configured to obtain the purpose of the incoming communication based on information included with the incoming communication. For example, the incoming communication may include an email and the router 112 may be configured to determine the purpose of the incoming communication based on content included in the subject line and/or body of the email.

As indicated above, in some instances more than one previous outgoing communication may be associated with a third-party address from which an incoming communication may be received. Additionally or alternatively, the previous outgoing communications associated with the same third-party address may originate from different specific communication addresses. For example, both the first previous outgoing communication and the second previous outgoing communication described above may be directed toward the third-party address 114. In addition, the first previous outgoing communication may have originated from the first address 118 and the second previous outgoing communication may have originated from the second address 120. Accordingly, in some embodiments, the router 112 may be configured to determine to which of the specific communication addresses to route the incoming communication.

In some embodiments, the router 112 may be configured to determine to which specific communication address to route the incoming communication based on one or more selection routing factors associated with selecting between specific communication addresses, as described below.

Examples are given below with respect to the selection routing factors and how the selection routing factors may be used to determine the routing between different specific communication addresses. But, the examples are not meant to be exhaustive. The examples are given with respect to the incoming communication received from the third-party address 114, the first previous outgoing communication to the third-party address 114 from the first address 118, and the second previous outgoing communication to the third-party address 114 from the second address 120. However, the principles described in the examples may be applied to any number of other communications. Further, the examples given are not mutually exclusive in that the determination factors associated with one example may be combined with the determination factors associated with one or more other examples may be used to route a particular incoming communication.

By way of example, the one or more selection routing factors that may be used to determine whether to route the incoming communication to the first address 118 or the second address 120 may include: an amount of time from when the first previous outgoing communication was sent from the first address 118; an amount of time from when the second previous outgoing communication was sent from the second address 120; a current status of the first address 118; a current status of the second address 120; a duration of one or more previous communications between the third-party address 114 and the first address 118; a duration of one or more previous communications between the third-party address 114 and the second address 120; a number of previous communications between the third-party address 114 and the first address 118; a number of previous communications between the third-party address 114 and the second address 120; information about the first person associated with the first address 118; information about the second person associated with the second address 120; information about the third person associated with the third-party address 114; a schedule of the first person; a schedule of the second person; a time of day that the incoming communication is received; a day of the week that the incoming communication is received; the purpose of the first previous outgoing communication; a purpose of the second previous outgoing communication; and the purpose of the incoming communication.

In one example, the router 112 may be configured to route the incoming communication based on a first amount of time from when the first previous outgoing communication was sent to when the incoming communication was received as compared to a second amount of time from when the second previous outgoing communication was sent to when the incoming communication was received. For example, in response to the first amount of time being less than the second amount of time, the router 112 may be configured to route the incoming communication to the first address 118 instead of to the second address 120. In contrast, in response to the first amount of time being greater than the second amount of time, the router 112 may be configured to route the incoming communication to the second address 120 instead of to the first address 118.

In some embodiments, the router 112 may be configured to determine the first amount of time and the second amount of time based on the communication log 122. For example, the first log entry may include a time and date of the first previous outgoing communication that the router 112 may compare against the time and date that the incoming communication was received to determine the first amount of time. The router 112 may similarly determine the second amount of time based on the second log entry.

In another example, the router 112 may be configured to route the incoming communication based on a first current status of the first address 118 as compared to a second current status of the second address 120. For example, in response to the first current status and the second current status indicating that the first address 118 is more available to receive the incoming communication than the second address 120, the router 112 may route the incoming communication to the first address 118 instead of to the second address 120. The first current status and the second current status may include one or more communication address statuses described above.

In another example, the router 112 may be configured to route the incoming communication based on a time of day, a day of the week, and/or a date that the incoming communication was received, a first schedule of the first person associated with the first address 118, and a second schedule of the second person associated with the second address 120. For example, the first schedule may indicate when the first person is available to attend to communications directed toward the first address 118. Similarly, the second schedule may indicate when the second person is available to attend to communications directed toward the second address 120. In response to the first schedule and the second schedule indicating that the first person is more available than the second person to attend to the incoming communication at the time, day, or date that the incoming communication is received, the router 112 may route the incoming communication to the first address 118 instead of to the second address 120. In some embodiments, the router 112 may be configured to obtain the schedule information from the person information 124.

As another example, the router 112 may be configured to route the incoming communication based on one or more first durations of one or more first previous communications between the first address 118 and the third-party address 114 and one or more second durations of one or more second previous communications between the second address 120 and the third-party address 114. The previous communications may be outgoing to the third-party address 114 or incoming from the third-party address 114.

By way of example, in response to the first previous outgoing communication having a duration greater than the second previous outgoing communication, the router 112 may route the incoming communication to the first address 118 instead of to the second address 120. As another example, in response to a first total duration of the first previous communications being greater than a second total duration of the second previous communications, the router 112 may route the incoming communication to the first address 118 instead of to the second address 120.

In some embodiments, the router may prioritize the durations of the most recent previous communications over the total durations or vice versa. For example, a first duration of a first most recent previous communication between the first address 118 and the third-party address 114 may be less than a second duration of a second most recent previous communication between the second address 120 and the third-party address 11. However, the first total duration may be greater than the second total duration. In some embodiments, the router 112 may be configured to obtain the information about the durations of previous communications from the communication log 122.

In embodiments in which the most recent communication durations are prioritized over the total durations, the incoming communication may be routed to the second address 120 instead of to the first address 118. By contrast, in embodiments in which the total durations are prioritized over the most recent communication durations, the incoming communication may be routed to the first address 118 instead of to the second address 120.

As another example, the router 112 may be configured to route the incoming communication based on a first number of first previous communications between the first address 118 and the third-party address 114 as compared to a second number of second previous communications between the second address 120 and the third-party address 114. For example, in response to the first number being greater than the second number, the router 112 may route the incoming communication to the first address 118 instead of to the second address 120. In some embodiments, the router 112 may be configured to obtain the information about the number of previous communications from the communication log 122.

As another example, the router 112 may be configured to route the incoming communication based on first information about the first person, second information about the second person, and/or third information about the third person For example, in some embodiments, the router 112 may be configured to compare the third information with the first information and the second information to determine whether the first person or the second person may be better suited to attend to the incoming communication. For instance, based on the first information, the second information, and the third information, the router 112 may determine that the first person has a skill set or responsibility that may better suit one or more factors that may be included in the third information than a skill set or responsibility of the second person. The router 112 may accordingly route the incoming communication to the first address 118 instead of to the second address 120.

As another example, the router 112 may be configured to route the incoming communication based on a first purpose of the first previous outgoing communication, a second purpose of the second previous outgoing communication, the first information about the first person, and the second information about the second person. For instance, the router 112 may be configured to determine, based on an analysis of the first purpose, the second purpose, the first information, and the second information, that the first person may be better suited to attend to the incoming communication than the second person. The router 112 may accordingly route the incoming communication to the first address 118 instead of to the second address 120. In some embodiments, the router 112 may be configured to obtain the first information and/or the second from the person information 124. In these or other embodiments, the router 112 may be configured to obtain the first purpose and/or the second purpose from the first log entry and/or the second log entry, respectively, of the communication log 122.

As another example, the router 112 may be configured to route the incoming communication based on a purpose of the incoming communication, the first information, and the second information. For instance, the router 112 may be configured to determine, based on an analysis of the purpose of the incoming communication, the first information, and the second information, that the first person may be better suited to attend to the incoming communication than the second person. The router 112 may accordingly route the incoming communication to the first address 118 instead of to the second address 120. In some embodiments, the router 112 may be configured to obtain the purpose of the incoming communication based on information included with the incoming communication.

The communication system 102 (e.g., via the router 112 and/or the data storage 110) may accordingly be configured to manage the routing of incoming communications based on previous outgoing communications as described above.

Modifications, additions, or omissions may be made to the environment 100 without departing from the scope of the present disclosure. For example, in some embodiments, although not specifically described, the communication host 108 may be configured to manage any number of general communication addresses and/or any number of specific communication addresses that may be associated with the same entity or one or more other entities. In these or other embodiments, the communication host 108 may be configured to manage any number of general communication accounts and/or any number of specific communication accounts that may correspond to the general communication addresses or the specific communication addresses. As such, the routing of incoming communications by the communication system 102 may be to any number of different communication addresses other than those explicitly described.

Further, as indicated above, the various routing factors and examples given above are merely examples and not limiting. For example, with respect to the selection examples, most of the examples are given in which the incoming communication is routed to the first address 118 instead of to the second address 120, however, the routing may be to the second address 120 instead of to the first address 118 depending on which factors may be analyzed and met.

Further, as indicated above, in some embodiments, multiple routing factors or selection routing factors and associated determinations may be made in making routing determinations in which there may be conflicts between different determinations. In these or other embodiments, different factors and determinations may be given different weights or priorities in resolving conflicts.

Figure 2:
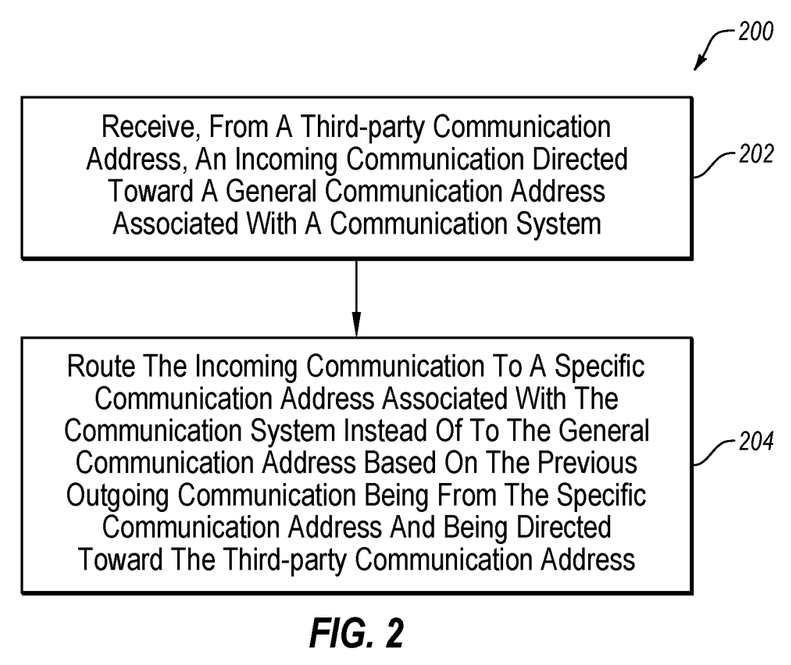
FIG. 2 is a flowchart of an example method to route incoming communications received at a communication system.

FIG. 2 is a flowchart of an example method 200 to route incoming communications received at a communication system. The method 200 may be arranged in accordance with at least one embodiment described in the present disclosure. The method 200 may be performed, in some embodiments, by a device or system, such as the communication system 102 of FIG. 1 or the system 300 of FIG. 3, or another device or system. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 202, where an incoming communication directed toward a general communication address associated with the communication system (e.g., the general address 116 of FIG. 1) may be received at the communication system. In some embodiments, the incoming communication may be from a third-party communication address that may not be associated with the communication system (e.g., the third-party address 114 of FIG. 1).

At block 204, the incoming communication may be routed to a specific communication address associated with the communication system (e.g., the first address 118 or the second address 120 of FIG. 1) instead of to the general communication address. In these or other embodiments, the incoming communication may be routed to the specific communication address based on the previous outgoing communication being from the specific communication address and being directed toward the third-party communication address.

In these or other embodiments, information about the previous outgoing communication may be stored in a communication log (e.g., the communication log 122 of FIG. 1) that indicates that the third-party communication address is a destination address of the previous outgoing communication. The communication log may also indicate that the previous outgoing communication originated from the specific communication address. In these or other embodiments, the incoming communication may be routed to the specific communication address based on the incoming communication being received from the third-party communication address and based on the communication log including the third-party communication address as the destination address of the previous outgoing communication.

In these or other embodiments, the method 200 may include identifying the previous outgoing communication from the communication log based on the incoming communication being received from the third-party communication address and based on the communication log including the third-party communication address as the destination address of the previous outgoing communication. In these or other embodiments, the incoming communication may be routed based on the identification of the previous outgoing communication from the communication log.

In these or other embodiments, the incoming communication may be routed to the specific communication address based on the incoming communication being received within a threshold amount of time from when the previous outgoing communication was sent.

In these or other embodiments, the incoming communication may be routed to the specific communication address based on one or more routing factors that may include: an amount of time from when the previous outgoing communication was sent from the specific communication address to when the incoming communication was received; a current status of the specific communication address; a schedule of a person associated with the specific communication address; a communication type of the incoming communication; a time of day that the incoming communication is received; a day of the week that the incoming communication is received; a date that the incoming communication is received; a duration of one or more previous communications between the third-party communication address and the specific communication address; a number of previous communications between the third-party communication address and the specific communication address; information about the person associated with the specific communication address; information about a person associated with the third-party communication address; a purpose of the previous outgoing communication; and a purpose of the incoming communication.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 200 may further include operations related to determining whether to route the incoming communication to the specific communication address indicated above (referred to below as the "first specific communication address") or to a second specific communication address associated with the communication system (e.g., to the first address 118 or the second address 120 of FIG. 1). In such instances, the previous outgoing communication that originated from the first specific communication address may be referred to as the "first previous outgoing communication." In addition, a second previous outgoing communication may have originated from the second specific communication address and may have been directed toward the third-party communication address.

In these or other embodiments, the method 200 may include one or more operations related to routing the incoming communication to the first specific communication address instead of to the second specific communication address based on one or more selection routing factors. The selection routing factors may include one or more of: an amount of time from when the first previous outgoing communication was sent from the first specific communication address; an amount of time from when the second previous outgoing communication was sent from the second specific communication address; a current status of the first specific communication address; a current status of the second specific communication address; a duration of one or more previous communications between the third-party communication address and the first specific communication address; a duration of one or more previous communications between the third-party communication address and the second specific communication address; a number of previous communications between the third-party communication address and the first specific communication address; a number of previous communications between the third-party communication address and the second specific communication address; information about a first person associated with the first specific communication address; information about a second person associated with the second specific communication address; information about a third person associated with the third-party communication address; a schedule of the first person; a schedule of the second person; a time of day that the incoming communication is received; a day of the week that the incoming communication is received; a purpose of the first previous outgoing communication; a purpose of the second previous outgoing communication; and a purpose of the incoming communication.

Additionally or alternatively, the method may include one or more operations related to receiving, from another third-party communication address, another incoming communication directed toward the general communication address. In these or other embodiments, the method may include one or more operations related to identifying, in response to receiving the other incoming communication, another previous outgoing communication directed toward the other third-party communication address from the specific communication address associated with the system and routing the other incoming communication to the general communication address instead of to the specific communication address.

In some instances, the routing to the general communication address instead of to the specific communication address may be based on one or more routing factors that may include: an amount of time from when the other previous outgoing communication was sent from the specific communication address to when the other incoming communication was received; a current status of the specific communication address; a schedule of a person associated with the specific communication address; a communication type of the other incoming communication; a time of day that the other incoming communication is received; a day of the week that the other incoming communication is received; a date that the other incoming communication is received; a duration of one or more previous communications between the other third-party communication address and the specific communication address; a number of previous communications between the other third-party communication address and the specific communication address; information about the person associated with the specific communication address; information about a person associated with the other third-party communication address; a purpose of the other previous outgoing communication; and a purpose of the other incoming communication.

Figure 3:
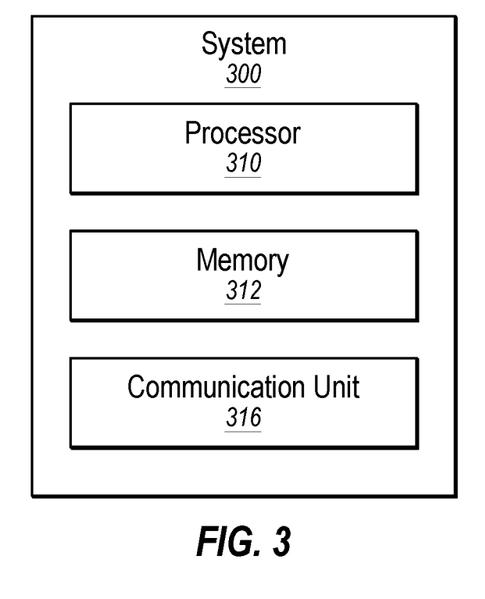
FIG. 3 illustrates an example computing system that may be used to route incoming communications received at a communication system, all arranged according to one or more embodiments described in the present disclosure.

FIG. 3 illustrates an example computing system 300 that may be used to route incoming communications received at a communication system. The system 300 may be arranged in accordance with at least one embodiment described in the present disclosure. The system 300 may include a processor 310, memory 312, and a communication unit 316, which all may be communicatively coupled. In some embodiments, the system 300 may be part of any of the systems or devices described in this disclosure.

For example, the system 300 may be part of the communication host 106 of FIG. 1 and may be configured to perform one or more of the operations described above with respect to the communication host 106. As another example, the system 300 may be part of the communication host 108 of FIG. 1 and may be configured to perform one or more of the operations described above with respect to the communication host 108.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

For example, in some embodiments, a communication router (e.g., the router 112 of FIG. 1) may be implemented using program instructions stored in the memory 312. The processor 310 may fetch the program instructions of the communication router and may execute the program instructions such that the computing system may implement the operations associated with the communication router as directed by the instructions.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310. As indicated above, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as described in this disclosure.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 316 may permit data to be exchanged with a network and/or any other devices or systems described in the present disclosure.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to route telephone communications, the method comprising:

receiving an incoming telephone communication directed toward a general telephone number associated with an entity, the incoming telephone communication being indicated as originating from a third-party telephone number;

identifying, in response to receiving the incoming telephone communication, a previous outgoing telephone communication that was directed toward the third-party telephone number and indicated as originating from a specific telephone number associated with the entity; and routing the incoming telephone communication to the specific telephone number based on the previous outgoing telephone communication being indicated as originating from the specific telephone number and being directed toward the third-party telephone number.

2. The method of claim 1, wherein the incoming telephone communication is routed to the specific telephone number further based on an amount of time from when the previous outgoing telephone communication was sent to when the incoming telephone communication was received.

3. The method of claim 1, wherein the incoming telephone communication is routed to the specific telephone number further based on a current status of the specific telephone number.

4. The method of claim 1, wherein the incoming telephone communication is routed to the specific telephone number further based on a duration of one or more previous telephone communications between the third-party telephone number and the specific telephone number.

5. The method of claim 1, wherein the incoming telephone communication is routed to the specific telephone number further based on a number of previous telephone communications between the third-party telephone number and the specific telephone number.

6. The method of claim 1, wherein:
the specific telephone number is a first specific telephone number;
the previous outgoing telephone communication is a first previous outgoing telephone communication; and
the incoming telephone communication is routed to the first specific telephone number instead of to a second specific telephone number in which the second specific telephone number is associated with the entity and in which a second previous outgoing telephone communication directed toward the third-party telephone number is indicated as originating from the second specific telephone number, the routing to the first specific telephone number instead of to the second specific telephone number being based on one or more selection routing factors of a plurality of selection routing factors.

7. The method of claim 6, wherein the plurality of selection routing factors include: an amount of time from when the first previous outgoing telephone communication was sent; an amount of time from when the second previous outgoing telephone communication was sent; a current status of the first specific telephone number; a current status of the second specific telephone number; a duration of one or more previous communications between the third-party telephone number and the first specific telephone number; a duration of one or more previous communications between the third-party telephone number and the second specific telephone number; a number of previous communications between the third-party telephone number and the first specific telephone number; a number of previous communications between the third-party telephone number and the second specific telephone number; information about a first person associated with the first specific telephone number; information about a second person associated with the second specific telephone number; information about a third person associated with the third-party telephone number; a schedule of the first person; a schedule of the second person; a time of day that the incoming telephone communication is received; a day of the week that the incoming telephone communication is received; a purpose of the first previous outgoing telephone communication; a purpose of the second previous outgoing telephone communication; and a purpose of the incoming telephone communication.

8. A communication system comprising:
data storage configured to store a communication log of a plurality of previous telephone communications associated with an entity;
one or more processors; and
one or more computer-readable media configured to store instructions that, in response to being executed by the one or more processors, cause the communication system to perform operations, the operations comprising:
receiving an incoming telephone communication directed toward a general telephone number associated with an entity, the incoming telephone communication being indicated as originating from a third-party telephone number;
identifying, from the communication log in response to receiving the incoming telephone communication, a previous outgoing telephone communication that was directed toward the third-party telephone number and indicated as originating from a specific telephone number associated with the entity; and
routing the incoming telephone communication to the specific telephone number based on the previous outgoing telephone communication being indicated as originating from the specific telephone number and being directed toward the third-party telephone number.

9. The communication system of claim 8, wherein the incoming telephone communication is routed to the specific telephone number further based on an amount of time from when the previous outgoing telephone communication was sent to when the incoming telephone communication was received.

10. The communication system of claim 8, wherein the incoming telephone communication is routed to the specific telephone number further based on a current status of the specific telephone number.

11. The communication system of claim 8, wherein the incoming telephone communication is routed to the specific telephone number further based on a duration of one or more previous telephone communications between the third-party telephone number and the specific telephone number.

12. The communication system of claim 8, wherein the incoming telephone communication is routed to the specific telephone number further based on a number of previous telephone communications between the third-party telephone number and the specific telephone number.

13. The communication system of claim 8, wherein:
the specific telephone number is a first specific telephone number;
the previous outgoing telephone communication is a first previous outgoing telephone communication; and
the incoming telephone communication is routed to the first specific telephone number instead of to a second specific telephone number in which the second specific telephone number is associated with the entity and in which a second previous outgoing telephone communication directed toward the third-party telephone number is indicated as originating from the second specific telephone number, the routing to the first specific telephone number instead of to the second specific telephone number being based on one or more selection routing factors of a plurality of selection routing factors.

14. The communication system of claim 13, wherein the plurality of selection routing factors include: an amount of time from when the first previous outgoing telephone communication was sent; an amount of time from when the second previous outgoing telephone communication was sent; a current status of the first specific telephone number; a current status of the second specific telephone number; a duration of one or more previous communications between the third-party telephone number and the first specific telephone number; a duration of one or more previous communications between the third-party telephone number and the second specific telephone number; a number of previous communications between the third-party telephone number and the first specific telephone number; a number of previous communications between the third-party telephone number and the second specific telephone number; information about a first person associated with the first specific telephone number; information about a second person associated with the second specific telephone number; information about a third person associated with the third-party telephone number; a schedule of the first person; a schedule of the second person; a time of day that the incoming telephone communication is received; a day of the week that the incoming telephone communication is received; a purpose of the first previous outgoing telephone communication; a purpose of the second previous outgoing telephone communication; and a purpose of the incoming telephone communication.

15. One or more computer-readable media configured to store instructions that, in response to being executed by one or more processors, cause a communication system to perform operations, the operations comprising:
receiving an incoming telephone communication directed toward a general telephone number associated with an entity, the incoming telephone communication being indicated as originating from a third-party telephone number;
identifying, in response to receiving the incoming telephone communication, a previous outgoing telephone communication that was directed toward the third-party telephone number and indicated as originating from a specific telephone number associated with the entity; and
routing the incoming telephone communication to the specific telephone number based on the previous outgoing telephone communication being indicated as originating from the specific telephone number and being directed toward the third-party telephone number.

16. The one or more computer-readable media of claim 15, wherein the incoming telephone communication is routed to the specific telephone number further based on an amount of time from when the previous outgoing telephone communication was sent to when the incoming telephone communication was received.

17. The one or more computer-readable media of claim 15, wherein the incoming telephone communication is routed to the specific telephone number further based on a current status of the specific telephone number.

18. The one or more computer-readable media of claim 15, wherein the incoming telephone communication is routed to the specific telephone number further based on a duration of one or more previous telephone communications between the third-party telephone number and the specific telephone number.

19. The one or more computer-readable media of claim 15, wherein the incoming telephone communication is routed to the specific telephone number further based on a number of previous telephone communications between the third-party telephone number and the specific telephone number.

20. The one or more computer-readable media of claim 15, wherein:
the specific telephone number is a first specific telephone number;
the previous outgoing telephone communication is a first previous outgoing telephone communication; and
the incoming telephone communication is routed to the first specific telephone number instead of to a second specific telephone number in which the second specific telephone number is associated with the entity and in which a second previous outgoing telephone communication directed toward the third-party telephone number is indicated as originating from the second specific telephone number, the routing to the first specific telephone number instead of to the second specific telephone number being based on one or more selection routing factors of a plurality of selection routing factors.

* * * * *